United States Patent
Lim et al.

(10) Patent No.: US 11,742,097 B2
(45) Date of Patent: Aug. 29, 2023

(54) URANIUM-DIOXIDE PELLET FOR NUCLEAR FUEL HAVING IMPROVED NUCLEAR-FISSION-GAS ADSORPTION PROPERTY, AND METHOD OF MANUFACTURING SAME

(71) Applicants: Kwang-young Lim, Seoul (KR); Tae-sik Jung, Sejong (KR); Yeon-su Na, Daejeon (KR); Min-jae Joo, Sejong (KR); Seung-jae Lee, Daejeon (KR); Yoon-ho Kim, Daejeon (KR)

(72) Inventors: Kwang-young Lim, Seoul (KR); Tae-sik Jung, Sejong (KR); Yeon-su Na, Daejeon (KR); Min-jae Joo, Sejong (KR); Seung-jae Lee, Daejeon (KR); Yoon-ho Kim, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 225 days.

(21) Appl. No.: 17/200,028

(22) Filed: Mar. 12, 2021

(65) Prior Publication Data
US 2021/0304905 A1 Sep. 30, 2021

Related U.S. Application Data

(63) Continuation of application No. PCT/KR2019/014483, filed on Oct. 30, 2019.

(30) Foreign Application Priority Data

Sep. 25, 2019 (KR) ........................ 10-2019-0118275

(51) Int. Cl.
*G21C 3/62* (2006.01)
*G21C 3/04* (2006.01)
*G21C 21/18* (2006.01)

(52) U.S. Cl.
CPC ............. *G21C 3/623* (2013.01); *G21C 3/045* (2019.01); *G21C 21/18* (2013.01)

(58) Field of Classification Search
CPC ........... G21C 3/045; G21C 3/62; G21C 3/623
(Continued)

(56) References Cited

U.S. PATENT DOCUMENTS

| 3,374,178 A * | 3/1968 | May | G21C 3/623 |
| | | | 376/901 |
| 5,447,894 A * | 9/1995 | Yasuoka | C04B 35/117 |
| | | | 501/153 |
| 2002/0149125 A1* | 10/2002 | Gradel | G21C 3/623 |
| | | | 264/0.5 |

FOREIGN PATENT DOCUMENTS

| EP | 1482517 A1 * | 12/2004 | .............. G21C 3/62 |
| JP | 47-003182 A * | 2/1972 | |

(Continued)

OTHER PUBLICATIONS

Assis, Gino de, Wilmar Barbosa Ferraz, and Elias Basile Tambourgi. "Aspects on sintering and grain growth in pure and Al 2 O 3-SiO 2 doped UO 2 pellets." (2009). (Year: 2009).*

(Continued)

*Primary Examiner* — Jack W Keith
*Assistant Examiner* — Jinney Kil
(74) *Attorney, Agent, or Firm* — Reinhart Boerner Van Deuren P.C.

(57) ABSTRACT

The present disclosure relates to a pellet containing an oxide additive to improve a nuclear-fission-gas-adsorption ability of a uranium-dioxide pellet used as nuclear fuel and increase the grain size thereof, and to a method of manufacturing the same. A $La_2O_3$—$Al_2O_3$—$SiO_2$ sintering additive is added to uranium dioxide so that mass movement is accelerated due to the liquid phase generated during sintering of the uranium-dioxide pellet, which promotes the growth of grains (Continued)

thereof. Further, since less volatilization occurs during sintering due to the low vapor pressure of the liquid phase, efficient additive performance is exhibited, so the liquid phase surrounding the grain boundary effectively adsorbs cesium, which is a nuclear fission gas.

9 Claims, 7 Drawing Sheets

(58) Field of Classification Search
USPC .............................................. 376/901, 418
See application file for complete search history.

(56) References Cited

FOREIGN PATENT DOCUMENTS

| | | |
|---|---|---|
| JP | H07-31267 B2 | 4/1995 |
| JP | H07-244180 A | 9/1995 |
| JP | 2603382 B2 | 4/1997 |
| JP | 3999843 B2 | 10/2007 |
| KR | 10-2000-0019009 A | 4/2000 |
| KR | 10-2011-0089801 A | 8/2011 |
| KR | 10-2017-0101083 A | 9/2017 |
| KR | 10-2018-0027390 A | 3/2018 |
| WO | WO 2019/231046 A1 | 12/2019 |

OTHER PUBLICATIONS

Kovacheva, Petya, and G. Avdeev. "Application of mechanochemical activation for synthesis of uranium-lanthanoid mixed oxides." Journal of Radioanalytical and Nuclear Chemistry 288.1 (2011): 221-227. (Year: 2011).*

Killeen, J. C. "The effect of additives on the irradiation behaviour of UO2." Journal of nuclear materials 58.1 (1975): 39-46. (Year: 1975).*

Hua, Deng, Zhou Yongzhong, and Yan Xuemin. "Yibin Nuclear Fuel Element Plant's Experience in Manufacturing of Large Grain Size Pellet." Advanced fuel pellet materials and designs for water cooled reactors (2004): 155. (Year: 2004).*

Matsunaga, J., "Chapter 2 Study on the mechanical and chemical improvement effects of UO2 pellets with alumina silicate added." Osaka University Doctoral Dissertation, 2014, pp. 1-112 (Year: 2014).*

Delafoy et al., "AREVA NP Cr2O3-Doped Fuel Development For BWRs." *Proceedings of the 2007 International LWR Fuel Performance Meeting*, 2007, vol. 1071, pp. 1-8.

Fuglesang, K., "In-pile results from the fission gas release mechanisms study in IFA-716 after final unloading." *OECD Halden Reactor Project*, Apr. 26, 2016, vol. HWR-1161, pp. 1-38.

Matsunaga, J., "Chapter 2 Study on the mechanical and chemical improvement effects of UO2 pellets with alumina silicate added." *Osaka University Doctoral Dissertation*, 2014, pp. 1-112.

Massih, Ali R., "Research 2014:21 Effects of additives on uranium dioxide fuel behavior." *Swedish Radiation Safety Authority*, Jan. 2014, vol. 2014, No. 21, pp. 1-62.

Matsuda et al., "Characteristics of Fuel Pellt With Additive Of Al and Si." *Advances in fuel pellet technology for improved performance at high burnup: Proceedings of a Technical Committee meeting held in Tokyo, Japan Oct. 28-Nov. 1, 1996*, 1996, vol. IAEA-TECDOC-1036, pp. 9-18.

* cited by examiner

Addition of 0.1 parts by weight of additive based on 100 parts by weight of uranium dioxide Ratio of additive $La_2O_3:Al_2O_3:SiO_2 = 1:3:6$ Average grain size (two dimensions): 45.5μm

URANIUM-DIOXIDE PELLET FOR NUCLEAR FUEL HAVING IMPROVED NUCLEAR-FISSION-GAS ADSORPTION PROPERTY, AND METHOD OF MANUFACTURING SAME

CROSS-REFERENCE TO RELATED PATENT APPLICATIONS

This patent application is a continuation of International Application No. PCT/KR2019/014483, filed on Oct. 30, 2019, which claims the benefit of priority to Korean Patent Application No. 10-2019-0118275 filed Sep. 25, 2019, the entire teachings and disclosures of both applications are incorporated herein by reference thereto.

TECHNICAL FIELD

The present disclosure relates to a pellet containing an oxide additive to increase the grain size of a uranium-dioxide pellet used as nuclear fuel and improve nuclear-fission-gas adsorption property, and to a method of manufacturing the same.

BACKGROUND ART

Uranium-dioxide pellets used in nuclear power plants have been actively studied since the 1970s in order to improve the performance thereof. First, the development of the uranium-dioxide pellet, which started in the 1970s, focused on the increase of grain sizes using the addition of oxides in order to prevent the failure of fuel rods that may be caused by the pellet/cladding interaction (PCI) during operation in a normal and transitional state. As a result of active research on additives around the world, nuclear fuel manufacturers AREVA (currently Framatome) and Westinghouse Atom have completed the development of $Cr_2O_3$ and $Cr_2O_3$—$Al_2O_3$, respectively, and currently have obtained approval from regulatory agencies for commercial development or are in the stage of obtaining approval from regulatory agencies for commercial development.

The phenomenon of fuel rod breakage caused by PCI starts to occur at 30 GWD/MTU or higher when the cladding tube and the pellet come into contact with each other, and from this time, the pellet serves to apply external force in the radial direction of the cladding tube, causing mechanical deformation and leading to fracture. However, the pellets having a large grain microstructure due to the added oxides are plastically deformed before the occurrence of deformation of the cladding tube, thereby serving to relieve the mutual stress with the cladding tube caused by volume expansion due to heat. Moreover, the area of the grain boundary that acts as a passage, through which various types of nuclear fission gases generated by a nuclear reaction, is reduced, thus reducing the rate of discharge of nuclear fission gases to the outside of the pellet. This is an important characteristic of a pellet having large grains, which improves the safety of nuclear fuel rods, in that the nuclear fission gases discharged from the uranium-dioxide pellet react with the inner surface of the fuel rod to form a ceramic compound, thereby accelerating brittle fracture. As described above, the role of the sintering additive for reducing PCI breakage is basically to increase the size of the grains of the uranium-dioxide pellet. This is a result of the promotion of movement of uranium cations at a sintering temperature by the oxide additive during sintering of uranium dioxide. The microstructure that is thereby developed serves to improve the safety and operating margins of a power plant upon operation in the reactor of a nuclear power plant.

Since then, due to the hydrogen explosion at Unit 1 at Fukushima in 2011 and consequent radioactive leakage, worldwide studies have been conducted with the aim of improving nuclear fuel performance to further improve safety. Eventually, the development of accident-tolerant fuel (ATF) began, focused on the pellet and the cladding tube. The global development of ATF nuclear fuel, which started with a research and development fund by the US Department of Energy since 2012, is research for deriving an appropriate current final candidate group, and has progressed to the level of unit testing of a test fuel rod (lead test rod, LTR), subsequent to investigative testing. Among ATF pellets developed to date, examples of uranium-dioxide-based candidates include a composite material type in which silicon carbide whiskers (SiC whisker) or diamond particles are dispersed in a uranium-dioxide pellet and a metal microcell type in which a metal network is formed in a uranium dioxide base, and these are all aimed at improving thermal conductivity. However, in terms of dimensional stability during manufacture and in-reactor operation, a uranium-dioxide pellet (containing an additive for reducing PCI breakage), to which oxides are added and which has large grains, is regarded as a strong final candidate most likely to be used in realizing an ATF pellet, but is still under development.

In general, the improvement of performance through the significant growth of grains is observed in pellets having an average grain size of 40 μm (two-dimensional measurement) or more. According to the study results of C. Delafoy et al., Proceedings of the 2007 International LWR Fuel Performance Meeting (2007), it was reported based on the results of an oxidation test that a weight reduction amount of a pellet having an average grain size of about 20 μm was 5 times higher than that of a pellet having an average grain size of 40 μm or more. That is, it can be seen that a pellet having large grains has high oxidation resistance.

According to the research results of K. Fuglesang HWR-1161, (2016), it was reported from results of operation in a test reactor that a nuclear fission gas amount measured in a pellet having a grain size of 40 μm or more was significantly lower than that measured in a typical pellet having a grain size of about 10 μm. A criterion for acceptance of radiation sources (source terms) that may be discharged to the outside in the event of an accident in a nuclear reactor is that such radiation cannot exceed 25 rem on the basis of the exclusion area boundary based on the U.S. NRC 10CFR50.67 "Accident source term", and a pellet having large grains has an effect of reducing the amount of radiation source that may leak to the outside in the event of such an accident.

In general, gaseous nuclear fission materials have the potential to have a significant influence on an external covering amount in terms of atmospheric diffusion. In this regard, a positive result of preventing atmospheric diffusion of gas by reacting nuclear fission gas with substances inside the pellet to form compounds was known by Oak Ridge National Lab. CNF11-19. Cesium (Cs), which is a representative nuclear fission gas, is bonded to silicon oxides to form a $Cs_2Si_4O_3$ compound, and is then stabilized. Accordingly, additives for manufacturing a pellet having large grains and containing silicon oxides to adsorb nuclear fission products have been developed in Japan.

Japanese Patent Nos. 2603382 and 3999843 propose the result that $Al_2O_3$ and $SiO_2$ at various ratios are added in an amount of 0.01 to 0.25 wt % to obtain large grains, thereby securing a high creep rate. It was reported that cesium was adsorbed in an aluminosilicate liquid phase formed using an additive of $Al_2O_3$ and $SiO_2$ through Matsunaga's 2014 doctoral dissertation, titled "Study on the interaction between cesium/iodode and helium oxide fuels" at Osaka University in Japan. In conclusion, a positive result was obtained in which the role of the additive does not end in promoting the growth of grains due to addition thereof, but the additive remains in a uranium dioxide base and adsorbs radiation-emitting gases generated due to nuclear fission. However, T. Matsuda et al., IAEA-TECDOC-1036 (1996) reported that the liquid phase formed using $Al_2O_3$ and $SiO_2$ was formed at a temperature much lower than the sintering temperature of uranium dioxide, so a weight reduction occurred due to volatilization caused by high vapor pressure during sintering. In Matsunaga's doctoral dissertation, it was confirmed that the average grain size remained at the level of about 20 μm (two-dimensional measurement) in two respective cases in which $Al_2O_3$—$SiO_2$ was added in amounts of 0.025 wt % and 0.25 wt %. From this perspective, it can be seen that the volatilization of a $SiO_2$-containing compound, which is capable of promoting the movement of materials at a sintering temperature in a specific sintering atmosphere to encourage the growth of grains and which is capable of adsorbing cesium as a nuclear fission product generated during operation in a nuclear reactor, serves to reduce the function thereof. That is, this means that even when the additive content is increased for the purpose of more active grain-growth promotion and nuclear-fission-material adsorption, the effect of the $Al_2O_3$—$SiO_2$ additive is limited due to the decrease in the liquid fraction caused by the volatilization.

Rare earth metal oxides are known to be added to oxides generally used as refractory materials, thus serving to increase the glass transition temperature ($T_g$) or melting point ($T_m$) of the refractory material. Based on the above principle, high field strength is formed in the bond of the amorphous metal-oxygen compounds present in a glass or liquid phase at high temperatures to thus improve the bonding strength of atoms of non-bridging oxygen (NBO), which increases the phase transformation temperature. However, it is not yet known what effect the rare earth metal oxide has on the boiling point ($T_b$).

CITATION LIST

Patent Literature (Patent Document 1) Japanese Patent No. 02603382 (Registration Date: Jan. 29, 1997)
(Patent Document 2) Japanese Patent No. 03999843 (Registration Date: Aug. 17, 2007)

Non-Patent Literature (Non-Patent Document 1) C. Delafoy et al., WRFPM 2007, San Francisco, USA (2007), p 1071.
(Non-Patent Document 2) K. Fuglesang, OECD HALDEN REACTOR PROJECT, HWR-1161 (2016) p 14.
(Non-Patent Document 3) T. Matsuda et al., IAEA-TECDOC-1036 (1996), p 9-17.
(Non-Patent Document 4) J. Matsunaga, Osaka University doctoral dissertation (2014), p 30.

DISCLOSURE

Technical Problem

An objective of the present disclosure is to provide a uranium-dioxide pellet containing an additive capable of effectively adsorbing cesium, which is a nuclear fission material, by increasing the Si content in uranium dioxide, which is a nuclear fuel used in a nuclear power plant and by stably forming a liquid phase so as to promote the growth of grains, and also provides a method of manufacturing the same. It is possible to secure a operation margin in the reactor with respect to PCI damage and nuclear power plant accidents by using the pellet having an improved microstructure.

Technical Solution

In order to accomplish the above objective, the present disclosure provides a uranium-dioxide pellet for nuclear fuel, which includes uranium dioxide and a nuclear fuel additive. The additive includes lanthanum oxide ($La_2O_3$), aluminum oxide ($Al_2O_3$), and silicon oxide ($SiO_2$). Uranium ions are rapidly moved through a liquid phase formed by adding $La_2O_3$—$Al_2O_3$—$SiO_2$ as the sintering additive, thus promoting the growth of grains, and the additive is applied on the grain boundary to thus improve the ability to adsorb cesium, which is a nuclear fission gas generated during operation in a reactor.

The total content of the additive may be 0.05 to 0.15 parts by weight based on 100 parts by weight of the uranium dioxide.

The content of the lanthanum oxide may be 0.005 to 0.015 parts by weight based on 100 parts by weight of the uranium dioxide.

In the additive, the content of the aluminum oxide may be 0.015 to 0.045 parts by weight.

In the additive, the content of the silicon oxide may be 0.03 to 0.09 parts by weight.

The uranium-dioxide pellet may have a grain size of 40 μm or more and a Si element volatilization ratio of less than 20% according to Equation 1 below.

$$\text{Si element volatilization ratio (\%)} = (\text{Si element volatilization weight} / \text{Si element addition weight}) \times 100 \quad [\text{Equation 1}]$$

Further, the present disclosure provides a method of manufacturing a uranium-dioxide pellet for nuclear fuel. The method includes (a) preparing uranium dioxide powder, (b) mixing lanthanum oxide ($La_2O_3$), aluminum oxide ($Al_2O_3$), and silicon oxide ($SiO_2$) to manufacture an additive, (c) adding the additive to the uranium dioxide powder, followed by mixing, thus manufacturing a mixed powder, (d) compression-molding the mixed powder to manufacture a green pellet, and (e) heating the green pellet in a sintering furnace in a reducing atmosphere to sinter the green pellet. Accordingly, in the present disclosure, the lanthanum oxide ($La_2O_3$), the aluminum oxide ($Al_2O_3$), and the silicon oxide ($SiO_2$) are added to the uranium dioxide powder, which is a pellet for nuclear fuel, followed by sintering in a weak reducing atmosphere, thus forming a liquid phase that is stable at high temperatures, whereby it is possible to effectively form large grains.

The total content of the additive may be 0.05 to 0.15 parts by weight based on 100 parts by weight of the uranium dioxide.

The content of the lanthanum oxide may be 0.005 to 0.015 parts by weight based on 100 parts by weight of the uranium dioxide.

In the additive, the content of the aluminum oxide may be 0.015 to 0.045 parts by weight.

In the additive, the content of the silicon oxide may be 0.03 to 0.09 parts by weight.

The uranium-dioxide pellet may have a grain size of 40 μm or more and a Si element volatilization ratio of less than 20% according to Equation 1 below.

Si element volatilization ratio (%)=(Si element volatilization weight/Si element addition weight)× 100　　　[Equation 1]

The step (e) may be performed at 1730 to 1780° C., and an injection rate of a hydrogen gas may be maintained at 200 to 2,000 ml/min.

Advantageous Effects

According to the present disclosure, a $La_2O_3$—$Al_2O_3$—$SiO_2$ sintering additive is added to uranium dioxide to increase a Si content, which causes a uranium-dioxide pellet to have improved ability to adsorb nuclear fission gases such as cesium.

Moreover, in the present disclosure, mass movement is accelerated due to the liquid phase generated during sintering of the pellet, which promotes the growth of the grains of the uranium-dioxide pellet. Further, since the liquid phase surrounds the grain boundary, it is possible to effectively adsorb cesium, which is a nuclear fission gas.

Accordingly, it is possible to reduce PCI damage and improve the safety margin in accident scenarios during sintering of the uranium-dioxide pellet.

BEST MODE

Hereinafter, the present disclosure will be described in detail.

The present disclosure provides a uranium-dioxide pellet for nuclear fuel, which includes uranium dioxide and an additive including lanthanum oxide ($La_2O_3$), aluminum oxide ($Al_2O_3$), and silicon oxide ($SiO_2$). The total content of the additive is 0.05 to 0.15 parts by weight based on 100 parts by weight of the uranium dioxide. Based on 100 parts by weight of the uranium dioxide, the content of the lanthanum oxide is 0.005 to 0.015 parts by weight, the content of the aluminum oxide is 0.015 to 0.045 parts by weight in the additive, and the content of the silicon oxide is 0.03 to 0.09 parts by weight in the additive. The additive includes the lanthanum oxide ($La_2O_3$), the aluminum oxide ($Al_2O_3$), and the silicon oxide ($SiO_2$), and forms a liquid phase at a sintering temperature to accelerate the mass movement of uranium atoms, thereby promoting the growth of grains thereof. Moreover, the additive serves to form a film at the interface of grains, thus adsorbing the nuclear fission gas generated during operation in a reactor of a nuclear power plant.

Further, the present disclosure provides a method of manufacturing a uranium-dioxide pellet for nuclear fuel. The method includes (a) mixing $La_2O_3$, $Al_2O_3$, and $SiO_2$ to manufacture an additive at step S11, (b) adding 0.05 to 0.1 parts by weight of the additive to 100 parts by weight of a uranium dioxide powder, followed by mixing, thus manufacturing a mixed powder at step S12, (c) compression-molding the mixed powder to manufacture a green pellet at step S13, and (d) heating the green pellet in a sintering furnace in a reducing atmosphere to 1730 to 1780° C., thus sintering the green pellet at step S14.

Based on 100 parts by weight of the uranium dioxide, the content of the lanthanum oxide may be 0.005 to 0.015 parts by weight in the additive, the content of the aluminum oxide may be 0.015 to 0.045 parts by weight in the additive, and the content of the silicon oxide may be 0.03 to 0.09 parts by weight in the additive.

Figure 1:
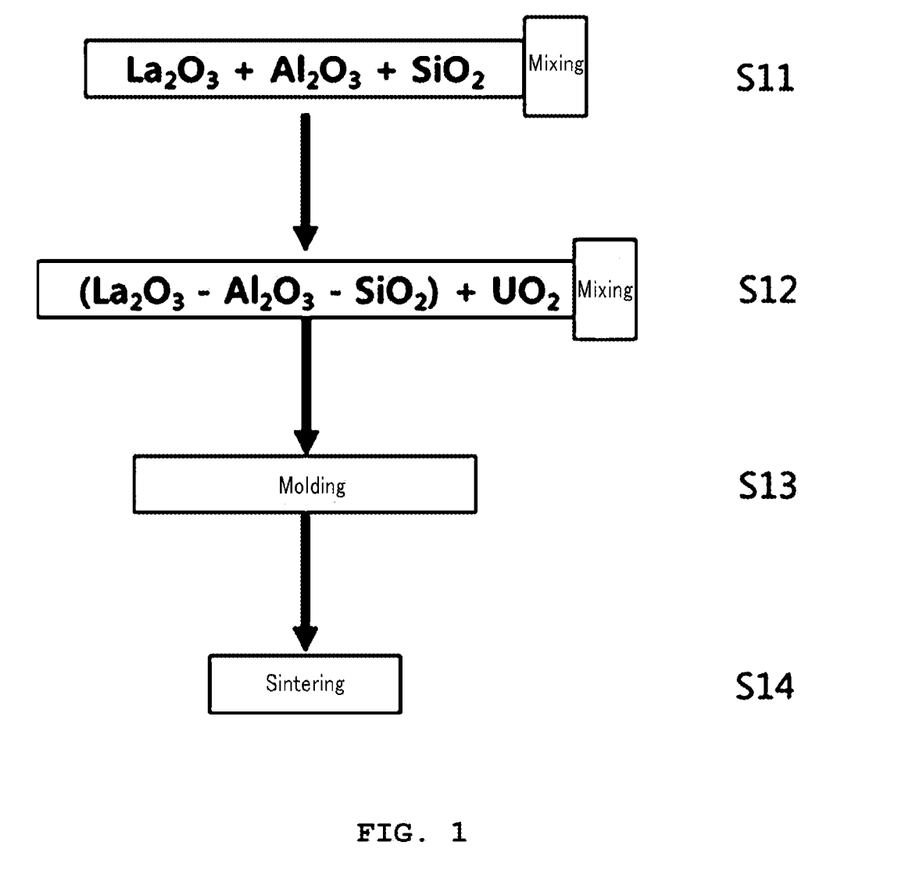
FIG. 1 is a process flow chart schematically showing a method of manufacturing a uranium-dioxide pellet according to an embodiment of the present disclosure.

FIG. 1 is a process view showing a method of manufacturing a uranium-dioxide pellet including an additive according to the present disclosure. Referring to FIG. 1, at step S11, the used additive is mixed with the uranium dioxide, and the additive includes $La_2O_3$, $Al_2O_3$, and $SiO_3$. With respect to the ratio of the oxide additive at step S11, as shown in a ternary-system equilibrium phase diagram of $La_2O_3$—$Al_2O_3$—$SiO_2$ of FIG. 3, the additive is added at the ratio (weight ratio) of $La_2O_3$, $Al_2O_3$, and $SiO_3$ in the composition range having the highest liquid fraction.

—Lanthanum Oxide ($La_2O_3$)—

Lanthanum oxide ($La_2O_3$) is a material that is not generally used as an additive for a uranium-dioxide pellet due to the high neutron absorption rate thereof. Mostly, lanthanum oxide is dissolved in an aluminosilicate liquid phase formed at 1500° C. or higher using $Al_2O_3$ and $SiO_2$, thereby increasing the viscosity thereof. Based on this effect, lanthanum oxide is mainly used to increase the transition temperature and melting point of refractory materials that are used at high temperatures. However, no study reporting an increase in the boiling point of aluminosilicate according to an increase in the viscosity thereof has yet been published. However, $La_2O_3$ may be added to suppress the volatilization of aluminosilicate during sintering of uranium dioxide, which effectively increases the grain size and improves the nuclear-fission-gas adsorption property during operation in a reactor of a nuclear power plant.

In order to suppress the volatilization of Si adsorbing the nuclear-fission-generation gas by preventing aluminosilicate from being volatilized, in the present disclosure, it is preferable to add $La_2O_3$ in 0.005 parts by weight or more based on 100 parts by weight of the uranium dioxide powder. However, since the increase in the viscosity of the aluminosilicate liquid phase limits the effect of increasing the grain size in the vicinity of the sintering temperature, $La_2O_3$ must be added in 0.015 parts by weight or less based on 100 parts by weight of the uranium dioxide.

—Aluminum Oxide ($Al_2O_3$) and Silicon Oxide ($SiO_2$)—

Figure 2:
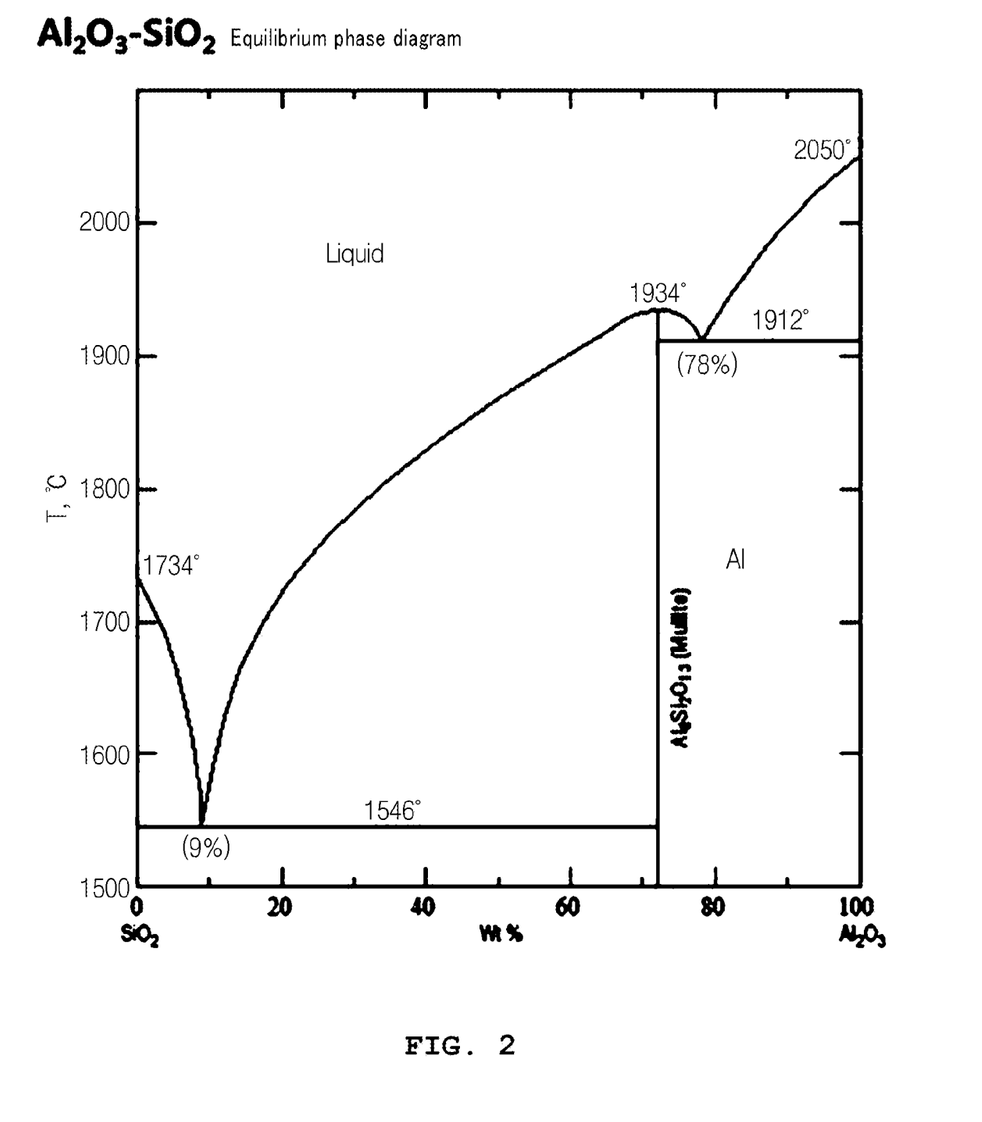
FIG. 2 is a binary-system equilibrium phase diagram of $Al_2O_3$—$SiO_2$.

From the equilibrium phase diagram of $Al_2O_3$—$SiO_2$ of FIG. 2, it can be confirmed that $Al_2O_3$ forms a liquid phase from 1546° C. together with $SiO_2$. The aluminosilicate liquid phase that is thus formed promotes the diffusion of $U^{4+}$ ions in the sintering temperature range (1700 to 1780° C.), thus promoting the growth of grains. The fraction of the aluminosilicate liquid phase that starts to form at 1546° C. is rapidly increased at a ratio at which the content of $SiO_2$ is two times higher than that of $Al_2O_3$. Therefore, a high liquid fraction may be obtained by selecting the ratio of $Al_2O_3$:$SiO_2$ to be at least 1:2, thereby promoting the growth of grains.

Accordingly, in the present disclosure, when $La_2O_3$ is added in 0.005 to 0.015 parts by weight based on 100 parts by weight of the uranium dioxide, it is preferable to add $Al_2O_3$ 0.015 to 0.045 parts by weight based on 100 parts by weight of the uranium dioxide powder. Further, it is preferable to add $SiO_2$ in 0.03 to 0.09 parts by weight based on 100 parts by weight of the uranium dioxide powder.

The mixing at the step S11 of the present disclosure includes homogeneous mixing using a turbula mixer capable of performing 3-axis rotational mixing together with zirconia balls having a diameter ($\Phi$) of 5 mm. At the step S11, only the additives are mixed first, and this is to maintain the composition ratio between the additive powders mixed with the uranium dioxide, which is a parent powder, in the parent powder because the additive system is a multi-component system. Uranium ions may be rapidly moved through the liquid phase obtained through the addition of the sintering additive of $La_2O_3$—$Al_2O_3$—$SiO_2$, thus promoting the growth of grains and being applied on the grain boundary, which improves the ability to adsorb cesium, which is a nuclear fission gas generated during operation in a reactor.

At the step S12, when the additive powder of $La_2O_3$—$Al_2O_3$—$SiO_3$ is added, the content of the additive is limited to 0.05 to 0.15 parts by weight based on 100 parts by weight of the uranium dioxide powder. The reason why the amount added at the step S12 is 0.05 parts by weight or more is that this amount causes a suitable liquid phase to be formed. In contrast, the reason why the amount does not exceed 0.1 parts by weight is to minimize the reduction in neutron economy due to the addition of elements having a high thermal neutron absorption cross section. When the amount is more than 0.1 parts by weight, the growth of grains is suppressed. Therefore, the amount that is added is limited to 0.05 to 0.1 parts by weight in order to apply a liquid phase containing $SiO_2$ on the grains for growth to an average size of 40 µm or more and for high adsorption of nuclear fission materials. With respect to the mixing, 3-axis rotation homogeneous mixing is performed using a turbula mixer together with zirconia balls having a diameter ($\Phi$) of 5 mm for 4 hours.

The step S13 is a step of compacting the mixed additive powders and uranium dioxide powder, and the mixed powder is placed in a mold to manufacture a green pellet under a pressure of 2.5 ton/$cm^2$.

The step S14 is a step of sintering the manufactured green pellet, and the sintering is performed for 3 to 5 hours while 100% hydrogen gas is injected at a temperature in the range of 1700 to 1780° C. at 200 to 2,000 ml/min. At the step S14, 100% hydrogen gas is injected at a rate of 200 ml/min or more to suppress an increase in oxygen potential caused by a small amount of oxygen that is discharged from the uranium dioxide or refractory material, thereby maintaining a reducing sintering atmosphere. On the other hand, the reason why the rate does not exceed 2,000 ml/min is to reduce the pressure applied to the inside due to the clogging of condensed water generated at the gas outlet due to a small amount of water vapor that is discharged during sintering. Through the above-described process, a large-grain pellet having an average grain size of 40 µm or more, in particular a grain size of 40 to 60 µm, may be manufactured.

Figure 3:
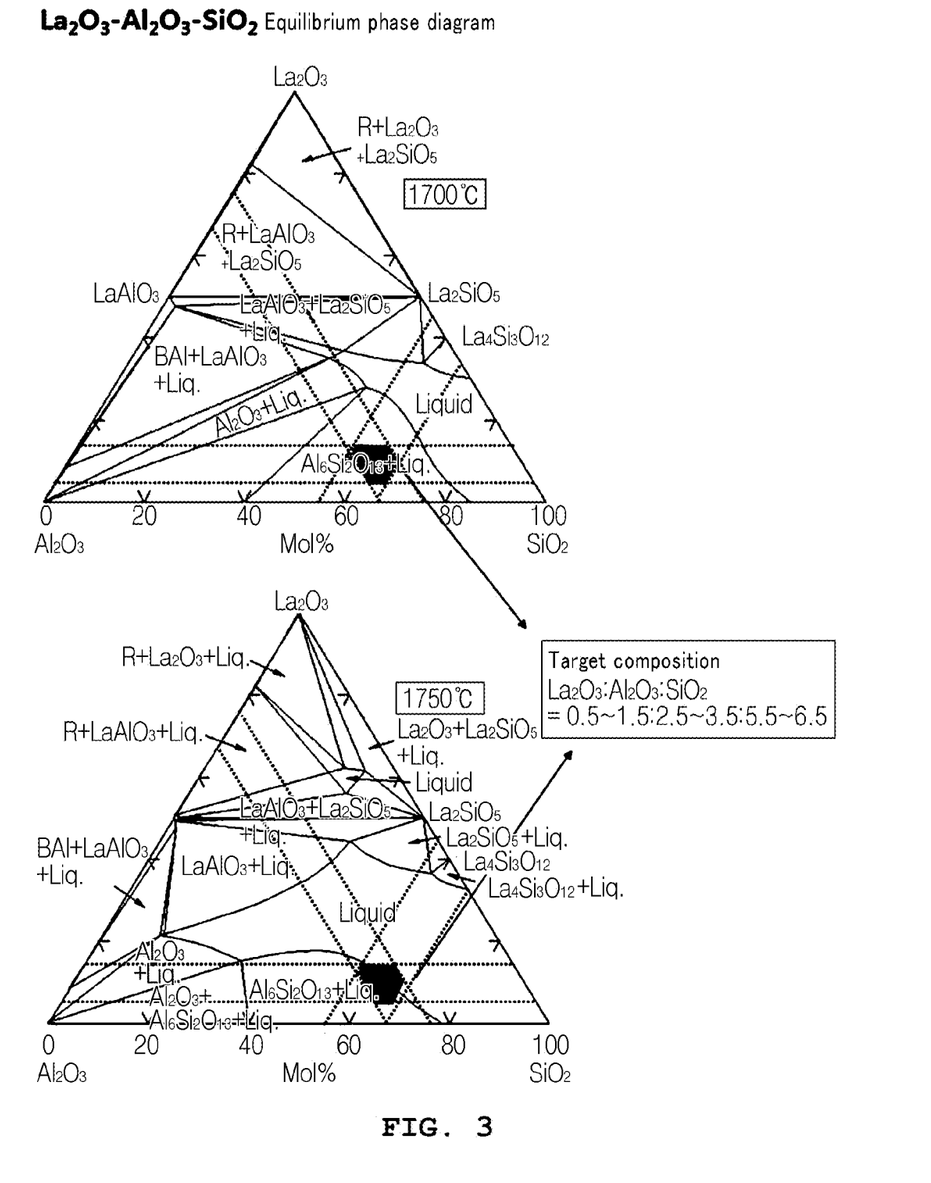
FIG. 3 is a ternary-system equilibrium phase diagram of $La_2O_3$—$Al_2O_3$—$SiO_2$.
Figure 4:
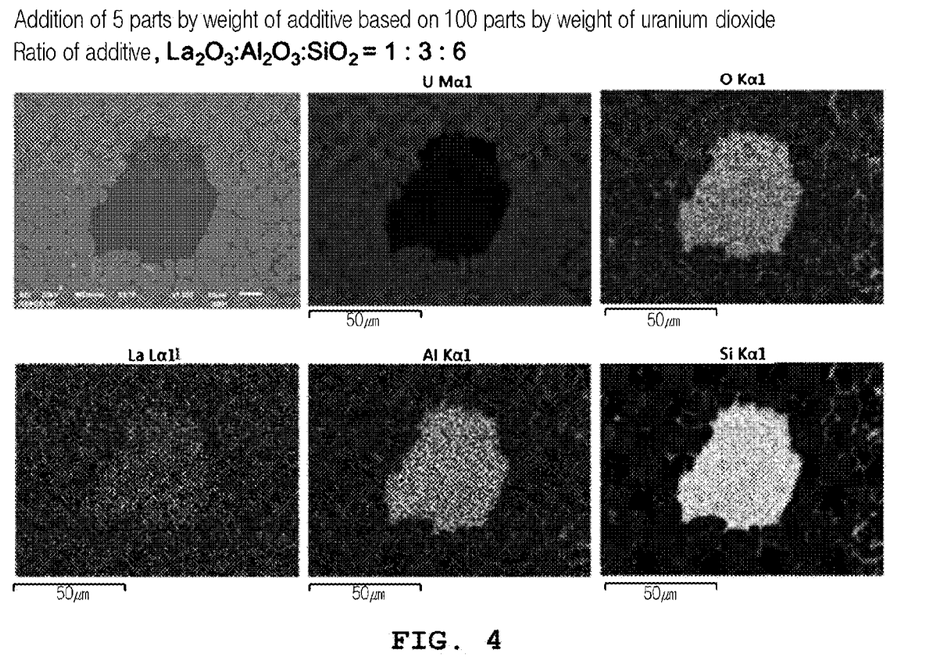
FIG. 4 shows the results of the distribution location of the metal element in the microstructure of a uranium-dioxide pellet, to which 5 parts by weight of a $La_2O_3$—$Al_2O_3$—$SiO_2$ additive is added, according to an embodiment of the present disclosure obtained using energy dispersive X-ray spectroscopy (EDS)

As can be seen from the ternary-system equilibrium phase diagram of $La_2O_3$—$Al_2O_3$—$SiO_2$ in FIG. 3, a liquid phase may be formed during this sintering process. For example, as shown in FIG. 4, for the purpose of observing the liquid phase, a signal, which is emitted from a region including lanthanum (La), aluminum (Al), and silicon (Si) elements surrounding the uranium-dioxide grains in the pellet, in which $La_2O_3$—$Al_2O_3$—$SiO_2$ is contained in an excessive amount of 5 parts by weight based on 100 parts by weight of the uranium dioxide, may be observed. Thereby, it can be clearly seen that the amorphous liquid phase, which surrounds the grain boundary, is actually formed.

The liquid phase may be effectively formed using the additives and process of the present disclosure, thus improving a nuclear-fission-gas adsorption property and promoting the growth of grains. Further, the component for adsorbing the nuclear fission material may be applied on the grain boundary, thus manufacturing a pellet for reducing PCI damage and securing excellent safety.

Mode for Disclosure

Hereinafter, the present disclosure will be described in more detail through Examples. It will be apparent to those of ordinary skill in the art that these Examples are for illustrative purposes only, and the scope of the present disclosure is not construed as being limited by these Examples.

Example 1. Manufacture of Uranium-Dioxide ($UO_2$) Pellet $La_2O_3$, $Al_2O_3$, and $SiO_2$ additives were homogeneously mixed in three dimensions for 4 hours using a turbula mixer together with zirconia balls having a diameter ($\Phi$) of 5 mm according to the compositions (addition ratio and parts by weight) described in Table 1 below. The mixed additives were added in 0.1 parts by weight to 100 parts by weight of the uranium dioxide powder, mixed for 4 hours using a turbula mixer, and compacted under a pressure of 3.5 ton/$cm^2$, thus manufacturing a green pellet. The green pellet was heated to 1730° C. at a rate of 5° C./min and sintered at 1730° C. for 4 hours. The sintering atmosphere was adjusted by injecting 100% hydrogen gas at a rate of 250 ml/min.

Examples 2 to 12

The same process as in Example 1 was performed to manufacture uranium-dioxide ($UO_2$) pellets, except that the additives having the compositions shown in Table 1 below were used.

Comparative Example 1

The same manufacturing process as in Example 1 was performed to manufacture a uranium-dioxide ($UO_2$) pellet, except that an additive not containing $La_2O_3$ and having the composition shown in Table 2 below was used.

Comparative Examples 2 to 16

The same manufacturing process as in Example 1 was performed to manufacture uranium-dioxide ($UO_2$) pellets, except that additives having the compositions shown in Table 2 below were used.

Measurement Example. Checking of Distribution Location of Metal Elements

The same manufacturing process as in Example 1 was performed. In order to clarify the observation of the liquid phase, the distribution location of the metal elements in the microstructure of the uranium-dioxide pellet, to which 5 parts by weight of the additive of $La_2O_3$—$Al_2O_3$—$SiO_2$ was added, was observed using energy dispersive X-ray spectroscopy (EDS). The observation results are shown in FIG. 4.

Referring to FIG. 4, it can be confirmed that the liquid phase is formed in the present disclosure, as in the ternary system of $La_2O_3$—$Al_2O_3$—$SiO_2$ of FIG. 3.

Measurement Example 1. Quantitative Analysis of Metal Elements (Measurement of Si Volatilization Resistance)

After sintering of the pellets manufactured in Examples 1 to 12 and Comparative Examples 1 to 16, an inductively coupled plasma spectrometer (ICP) was used to quantitatively analyze elemental Si metal.

Through this analysis, it is possible to measure the amount of silicon oxide, which has excellent nuclear-fission-gas adsorption property, among the additives added before the sintering, remaining in the pellet after volatilization during the sintering. Metallic silicon (Si) was quantitatively measured to quantitatively analyze silicon oxide ($SiO_2$) added in the form of oxides.

Figure 6:
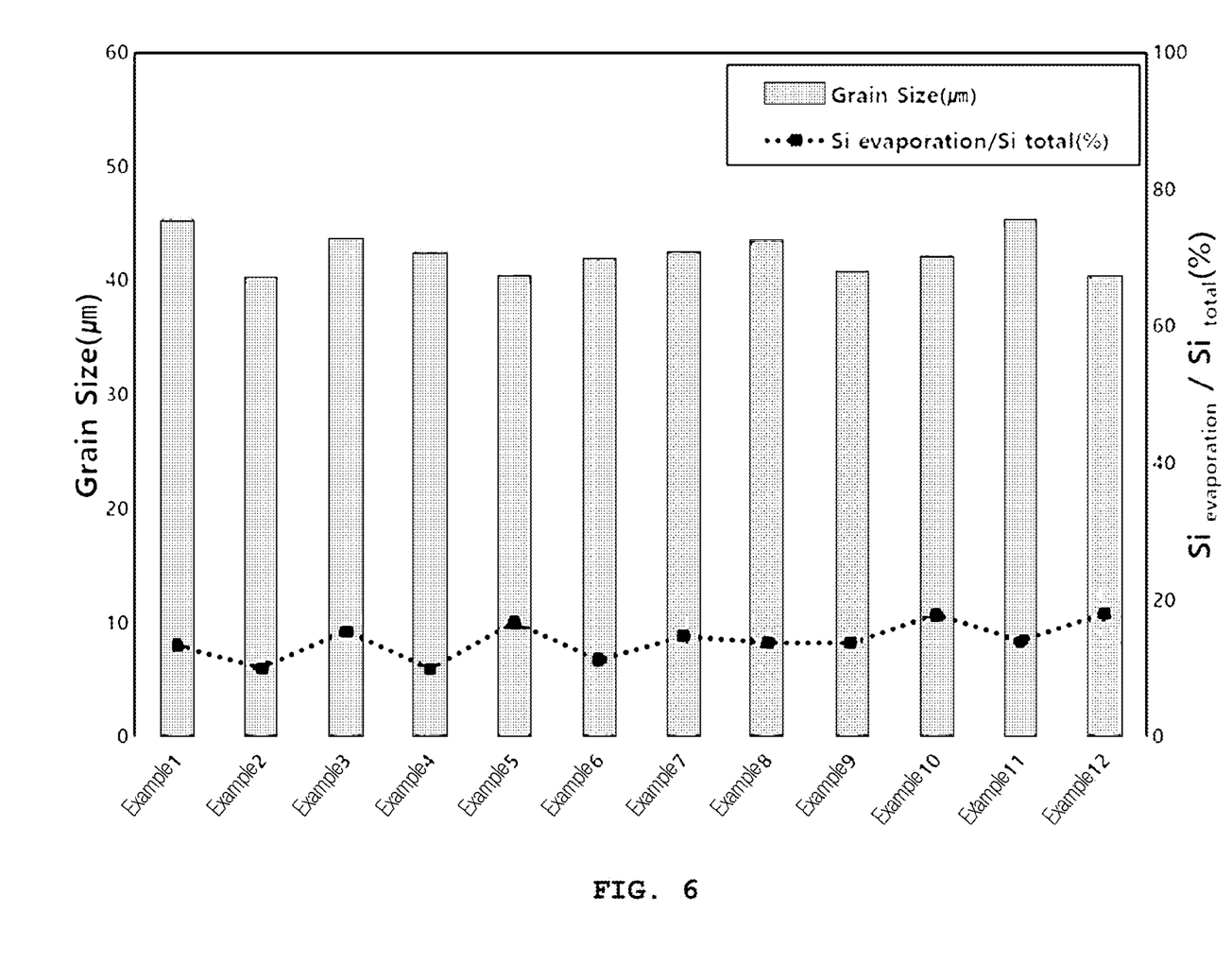
FIG. 6 shows the results of grain size measurement and quantitative analysis of the Si element of the uranium-dioxide pellet manufactured according to an Example of the present disclosure.
Figure 7:
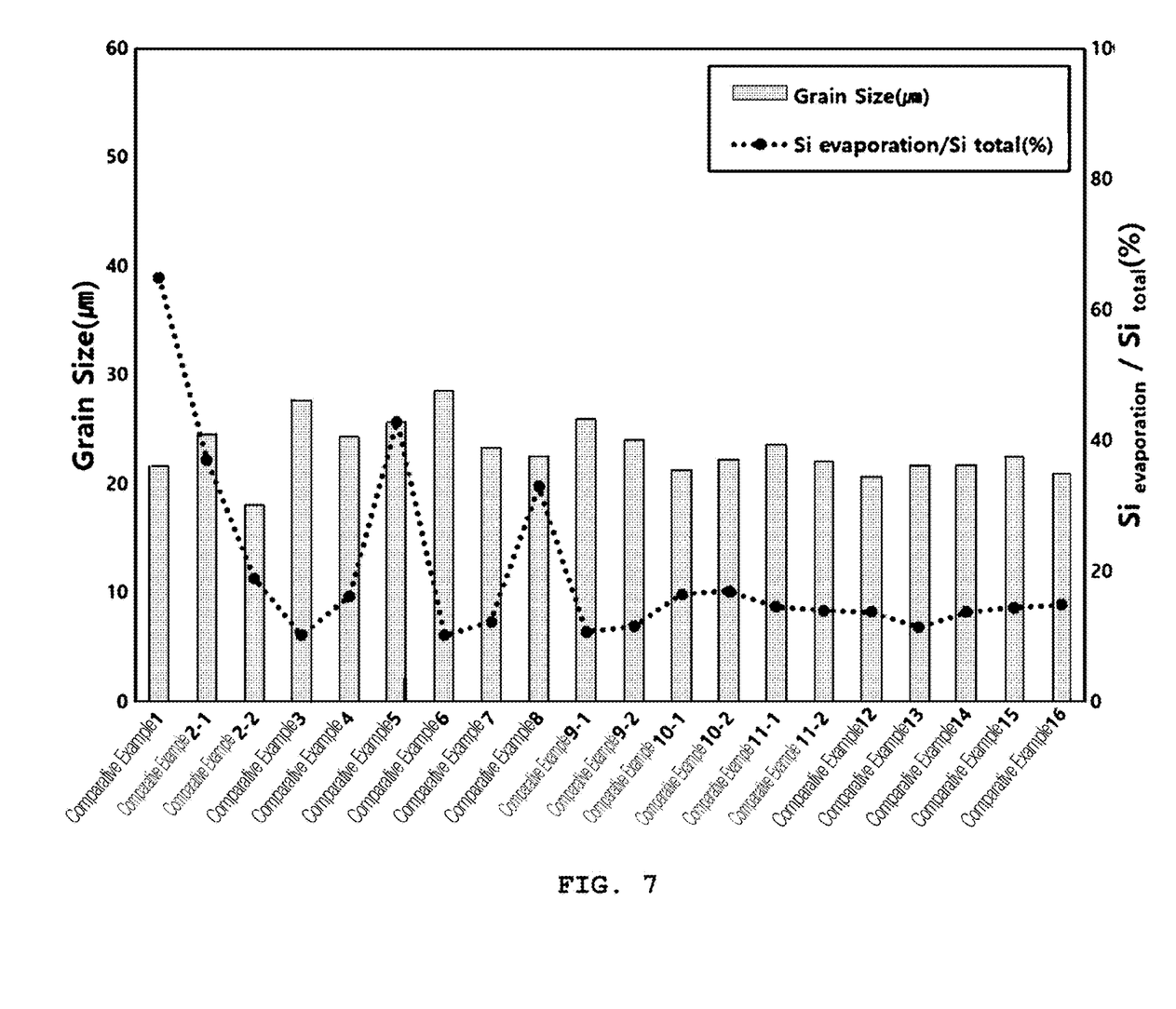
FIG. 7 shows the results of grain size measurement and quantitative analysis of the Si element of the uranium-dioxide pellet manufactured according to a Comparative Example of the present disclosure.

The amount of silicon metal element in the uranium-dioxide pellets manufactured in Examples 1 to 12 and in Comparative Examples 1 to 16 was measured to calculate the volatilization content, the volatilization ratio (%) was calculated using Equation 1 below, and the results are shown in Table 1 (Examples), Table 2 (Comparative Examples), FIG. 6 (Examples), and FIG. 7 (Comparative Examples).

$$\text{Si element volatilization ratio (\%)} = (\text{Si element volatilization weight}/\text{Si element addition weight}) \times 100 \quad [\text{Equation 1}]$$

Measurement Example 2. Measurement of Grain Size

Figure 5:
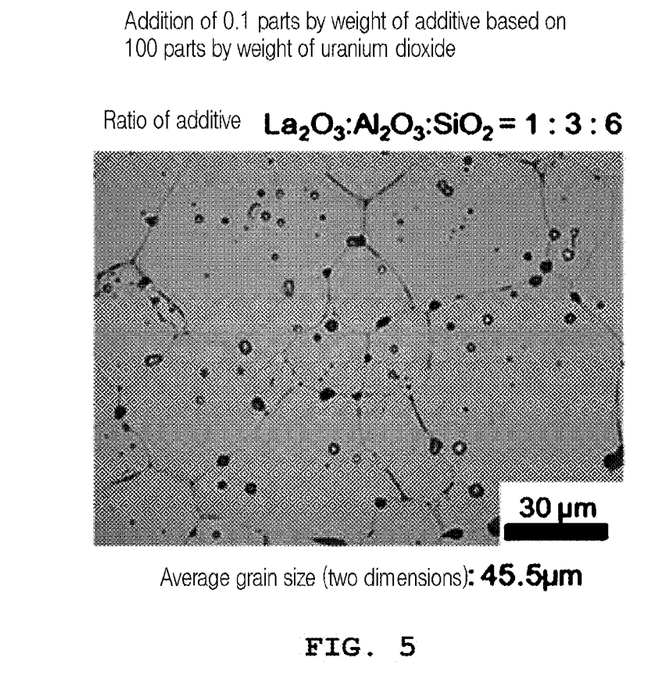
FIG. 5 is a picture obtained by photographing the microstructure of the uranium-dioxide pellet, to which $La_2O_3$—$Al_2O_3$—$SiO_2$ and $Al_2O_3$—$SiO_2$ are added in amounts of 0.1 parts by weight and 0.09 parts by weight, respectively, based on 100 parts by weight of uranium dioxide, and which is manufactured according to an embodiment of the present disclosure, using an optical microscope (×1,000 magnification)

The results obtained by photographing (×1,000 magnification) the microstructures of the pellets of Example 1 and Comparative Example 1 using an optical microscope are shown in FIG. 5. The grain sizes of the pellets manufactured in Examples 1 to 12 and Comparative Examples 1 to 16 were measured, are summarized in Table 1 (Examples) and Table 2 (Comparative Examples), and are shown in FIG. 6 (Examples) and FIG. 7 (Comparative Examples).

TABLE 1

Total content of $La_2O_3$, $Al_2O_3$, and $SiO_2$ based on 100 parts by weight of $UO_2$

| | Content of additive (parts by weight) | Ratio of $La_2O_3$, $Al_2O_3$, and $SiO_2$ in additive | $La_2O_3$ Parts by weight (ppm) | $Al_2O_3$ Parts by weight (ppm) | $SiO_2$ Parts by weight (ppm) | Si volatilization weight, ppm (volatilization weight/addition weight × 100, %) | Grain size (μm) |
|---|---|---|---|---|---|---|---|
| Example 1 | 0.1 | 1:3:6 | 0.01 (100) | 0.03 (300) | 0.06 (600) | 50 (13.4) | 45.5 |
| Example 2 | 0.05 | 1:3:6 | 0.005 (50) | 0.015 (150) | 0.03 (300) | 19 (10.1) | 40.4 |
| Example 3 | 0.0925 | 0.25:3:6 | 0.0025 (25) | 0.03 (300) | 0.06 (600) | 58 (15.5) | 43.8 |
| Example 4 | 0.15 | 1:3:6 | 0.015 (150) | 0.045 (450) | 0.09 (900) | 56 (10) | 42.6 |
| Example 5 | 0.095 | 0.5:3:6 | 0.005 (50) | 0.03 (300) | 0.06 (600) | 63 (16.8) | 40.6 |
| Example 6 | 0.105 | 1.5:3:6 | 0.015 (150) | 0.03 (300) | 0.06 (600) | 42 (11.3) | 41.9 |
| Example 7 | 0.085 | 1:1.5:6 | 0.01 (100) | 0.0015 (150) | 0.06 (600) | 55 (14.8) | 42.6 |
| Example 8 | 0.115 | 1:4.5:6 | 0.01 (100) | 0.045 (450) | 0.06 (600) | 52 (13.9) | 43.6 |
| Example 9 | 0.07 | 1:3:3 | 0.01 (100) | 0.03 (300) | 0.03 (300) | 26 (13.9) | 41.1 |
| Example 10 | 0.13 | 1:3:9 | 0.01 (100) | 0.03 (300) | 0.09 (900) | 100 (17.9) | 42.2 |
| Example 11 | 0.13 | 1:4:8 | 0.01 (100) | 0.04 (400) | 0.08 (800) | 70 (14.1) | 45.5 |
| Example 12 | 0.0675 | 0.75:2:4 | 0.0075 (75) | 0.02 (200) | 0.04 (400) | 45 (18.1) | 40.5 |

TABLE 2

Total content of $La_2O_3$, $Al_2O_3$, and $SiO_2$ based on 100 parts by weight of $UO_2$: 0.1 parts by weight (Total content of additive of $La_2O_3$, $Al_2O_3$, and $SiO_2$ is 0.04 parts by weight in Comparative Example 1) (Total content of additive of $La_2O_3$, $Al_2O_3$, and $SiO_2$ is 0.05 parts by weight in Comparative Example 2) (Total content of additive of $Al_2O_3$ and $SiO_2$ is 0.09 parts by weight in Comparative Example 7)

| | Content of additive (parts by weight) | Ratio of $La_2O_3$, $Al_2O_3$, and $SiO_2$ in additive | $La_2O_3$ Parts by weight (ppm) | $Al_2O_3$ Parts by weight (ppm) | $SiO_2$ Parts by weight (ppm) | Si volatilization weight ppm (volatilization weight/addition weight × 100, %) | Grain size (μm) |
|---|---|---|---|---|---|---|---|
| Comparative Example 1 | 0.09 | 0:3:6 | 0 | 0.03 (300) | 0.06 (600) | 240 (64.9) | 21.5 |
| Comparative Example 2-1 | 0.04 | 1:3:6 | 0.004 (40) | 0.012 (120) | 0.024 (240) | 46 (37.0) | 24.6 |

TABLE 2-continued

Total content of $La_2O_3$, $Al_2O_3$, and $SiO_2$ based on 100 parts by weight of $UO_2$: 0.1 parts by weight (Total content of additive of $La_2O_3$, $Al_2O_3$, and $SiO_2$ is 0.04 parts by weight in Comparative Example 1) (Total content of additive of $La_2O_3$, $Al_2O_3$, and $SiO_2$ is 0.05 parts by weight in Comparative Example 2) (Total content of additive of $Al_2O_3$ and $SiO_2$ is 0.09 parts by weight in Comparative Example 7)

| | Content of additive (parts by weight) | Ratio of $La_2O_3$, $Al_2O_3$, and $SiO_2$ in additive | $La_2O_3$ Parts by weight (ppm) | $Al_2O_3$ Parts by weight (ppm) | $SiO_2$ Parts by weight (ppm) | Si volatilization weight ppm (volatilization weight/ addition weight × 100, %) | Grain size (μm) |
|---|---|---|---|---|---|---|---|
| Comparative Example 2-2 | 0.04 | 1.5:3:6 | 0.005 (50) | 0.01 (100) | 0.02 (200) | 28 (18.8) | 18.1 |
| Comparative Example 3 | 0.1 | 1:6:3 | 0.01 (100) | 0.06 (600) | 0.03 (300) | 19 (10.1) | 27.6 |
| Comparative Example 4 | 0.1 | 1:1:8 | 0.01 (100) | 0.01 (100) | 0.08 (800) | 81 (16.1) | 24.3 |
| Comparative Example 5 | 0.092 | 0.2:3:6 | 0.002 (20) | 0.03 (300) | 0.06 (600) | 160 (42.9) | 25.6 |
| Comparative Example 6 | 0.11 | 2:3:6 | 0.02 (200) | 0.03 (300) | 0.06 (600) | 38 (10.1) | 28.5 |
| Comparative Example 7 | 0.115 | 2.5:3:6 | 0.025 (250) | 0.03 (300) | 0.06 (600) | 45 (12.2) | 23.3 |
| Comparative Example 8 | 0.094 | 0.4:3:6 | 0.004 (40) | 0.03 (300) | 0.06 (600) | 123 (32.9) | 22.6 |
| Comparative Example 9-1 | 0.11 | 2:3:6 | 0.02 (200) | 0.03 (300) | 0.06 (600) | 40 (10.7) | 25.9 |
| Comparative Example 9-2 | 0.106 | 1.6:3:6 | 0.016 (160) | 0.03 (300) | 0.06 (600) | 43 (11.5) | 24 |
| Comparative Example 10-1 | 0.08 | 1:1:6 | 0.01 (100) | 0.01 (100) | 0.06 (600) | 61 (16.4) | 21.3 |
| Comparative Example 10-2 | 0.084 | 1:1.4:6 | 0.01 (100) | 0.014 (140) | 0.06 (600) | 63 (16.9) | 22.1 |
| Comparative Example 11-1 | 0.12 | 1:5:6 | 0.01 (100) | 0.05 (500) | 0.06 (600) | 54 (14.5) | 23.5 |
| Comparative Example 11-2 | 0.116 | 1:4.6:6 | 0.01 (100) | 0.046 (460) | 0.06 (600) | 52 (13.9) | 22 |
| Comparative Example 12 | 0.06 | 1:3:2 | 0.01 (100) | 0.03 (300) | 0.02 (200) | 51 (13.7) | 20.6 |
| Comparative Example 13 | 0.14 | 1:3:10 | 0.01 (100) | 0.03 (300) | 0.1 (1000) | 71 (11.4) | 21.6 |
| Comparative Example 14 | 0.16 | 1.5:5.9:9.5 | 0.015 (150) | 0.05 (500) | 0.095 (950) | 81 (13.7) | 21.65 |
| Comparative Example 15 | 0.16 | 2:4.5:9.5 | 0.02 (200) | 0.045 (450) | 0.095 (950) | 85 (14.4) | 22.45 |
| Comparative Example 16 | 0.16 | 2:5:9 | 0.02 (200) | 0.05 (500) | 0.09 (900) | 83 (14.8) | 20.85 |

Measurement Results. Si Volatilization Resistance and Grain Size

—Lanthanum Oxide ($La_2O_3$)—

Referring to Table 1 (FIG. 6) and Table 2 (FIG. 7), comparing Example 1 (grain size: 45.5 μm, Si volatilization ratio: 13.4%) and Comparative Example 1 (grain size: 21.5 μm, Si volatilization ratio: 64.9%), it can be confirmed that Si volatilization resistance is improved and the grain size is increased due to the presence of lanthanum oxide ($La_2O_3$).

Comparing Example 1 and Example 3, even when the contents of the aluminum oxide ($Al_2O_3$) and the silicon oxide ($SiO_2$) are maintained the same and even when the content of the lanthanum oxide ($La_2O_3$) is adjusted, the Si volatilization resistance is improved and the grain size is increased. Referring to Examples 5 and 6, it can be confirmed that the presence of the lanthanum oxide ($La_2O_3$) and the appropriate content range thereof are important factors in improving the Si volatilization resistance and in increasing the grain size.

Comparing Example 2, Example 5, Comparative Example 2-1, and Comparative Example 8, the minimum content of the lanthanum oxide ($La_2O_3$) at which the Si volatilization resistance is improved and the grain size is increased can be confirmed. When the minimum content of the lanthanum oxide ($La_2O_3$) is 0.005 parts by weight or more based on 100 parts by weight of the uranium dioxide ($UO_2$), it can be confirmed that Si volatilization resistance is improved and that the growth of grains is promoted. In contrast, when the minimum content is less than 0.005 parts by weight, it can be confirmed that the Si volatilization resistance is slightly improved but the grains grow more slowly.

Comparing Example 4, Example 6, Comparative Example 9-1, and Comparative Example 9-2, the maximum content of the lanthanum oxide ($La_2O_3$) at which the Si volatilization resistance is improved and the grain size is increased can be confirmed. From the results of the grain size and the Si volatilization ratio of the pellets manufactured in Comparative Example 9-1 and Comparative Example 9-2, it can be confirmed that the addition of an excess amount of lanthanum oxide ($La_2O_3$) serves to reduce the Si volatilization ratio but causes the grain size to be reduced.

—Aluminum Oxide ($Al_2O_3$)—

Comparing Example 7, Comparative Example 10-1, and Comparative Example 10-2, the minimum content of the aluminum oxide ($Al_2O_3$) at which the Si volatilization resistance is improved and the grain size is increased can be confirmed. When the minimum content of the aluminum oxide ($Al_2O_3$) is 0.015 parts by weight or more based on 100 parts by weight of the uranium dioxide ($UO_2$), it can be confirmed that Si volatilization resistance is improved and that the growth of grains is promoted. In contrast, when the minimum content is less than 0.015 parts by weight, it can be confirmed that the Si volatilization resistance is slightly improved but that the grains grow more slowly.

Comparing Example 8, Comparative Example 11-1, and Comparative Example 11-2, the maximum content of the aluminum oxide ($Al_2O_3$) at which the Si volatilization resistance is improved and the grain size is increased can be confirmed. When the maximum content of the aluminum oxide ($Al_2O_3$) is more than 0.045 parts by weight based on 100 parts by weight of the uranium dioxide ($UO_2$), it can be confirmed that the Si volatilization resistance is slightly improved but that the grains grow slowly.

—Silicon oxide ($SiO_2$)—

Comparing Example 9 and Comparative Example 12, the minimum content of the silicon oxide ($SiO_2$) at which the Si volatilization resistance is improved and the grain size is increased can be confirmed. When the minimum content of the silicon oxide ($SiO_2$) is 0.03 parts by weight or more based on 100 parts by weight of the uranium dioxide ($UO_2$), it can be confirmed that the Si volatilization resistance is improved and the growth of grains is promoted. In contrast, when the minimum content is less than 0.03 parts by weight, it can be confirmed that the Si volatilization resistance is slightly improved but that the grains grow more slowly.

Comparing Example 10 and Comparative Example 13, the maximum content of the silicon oxide ($SiO_2$) at which the Si volatilization resistance is improved and the grain size is increased can be confirmed. When the maximum content of the silicon oxide ($SiO_2$) is more than 0.09 parts by weight based on 100 parts by weight of the uranium dioxide ($UO_2$), it can be confirmed that the Si volatilization resistance is improved slightly but that the grains grow more slowly.

—Total Content of Additive—

Comparing Example 2, Comparative Example 2-1, and Comparative Example 2-2, the minimum content of the additive at which the Si volatilization resistance is improved and the grain size is increased can be confirmed. When the total content of the additive is less than 0.05 parts by weight based on 100 parts by weight of the uranium dioxide, it can be confirmed through Comparative Examples 2-1 and 2-2 that, due to the presence of the lanthanum oxide ($La_2O_3$), Si volatilization resistance is improved but the grain size is not increased.

Comparing Example 4 and Comparative Examples 14 to 16, the maximum content of the additive at which the Si volatilization resistance is improved and the grain size is increased can be confirmed. When the total content of the additive is more than 0.15 parts by weight based on 100 parts by weight of the uranium dioxide, it can be confirmed through Comparative Examples 14 to 16 that, due to the presence of the lanthanum oxide ($La_2O_3$), the Si volatilization resistance is improved but the grain size is not increased.

Although specific parts of the present disclosure have been described in detail, it will be apparent to those of ordinary skill in the art that this specific description is only a preferred embodiment, and the scope of the present disclosure is not limited thereby. Therefore, it will be said that the practical scope of the present disclosure is defined by the appended claims and their equivalents.

The invention claimed is:

1. A uranium-dioxide pellet for nuclear fuel, comprising:
   uranium dioxide; and
   a nuclear fuel additive,
   wherein the additive includes lanthanum oxide ($La_2O_3$), aluminum oxide ($Al_2O_3$), and silicon oxide ($SiO_2$); and
   wherein the additive is in a form of liquid phase which surrounds grains comprising the uranium dioxide in the pellet.

2. The uranium-dioxide pellet of claim 1, wherein the additive is included in 0.05 to 0.15 parts by weight based on 100 parts by weight of the uranium dioxide.

3. The uranium-dioxide pellet of claim 1, wherein the lanthanum oxide is 0.005 to 0.015 parts by weight, the aluminum oxide is 0.015 to 0.045 parts by weight, and the silicon oxide is 0.03 to 0.09 parts by weight based on 100 parts by weight of the uranium dioxide.

4. The uranium-dioxide pellet of claim 1, wherein the uranium-dioxide pellet has a grain size of the grains comprising the uranium dioxide of 40 to 60 μm and a Si element volatilization ratio of less than 20% according to Equation 1 below:

$$\text{Si element volatilization ratio (\%)} = (\text{Si element volatilization weight}/\text{Si element addition weight}) \times 100. \quad \text{[Equation 1]}$$

5. A method of manufacturing the uranium-dioxide pellet for nuclear fuel according to claim 1, comprising:
   (a) preparing uranium dioxide powder;
   (b) mixing lanthanum oxide ($La_2O_3$), aluminum oxide ($Al_2O_3$), and silicon oxide ($SiO_2$) to manufacture an additive;
   (c) adding the additive to the uranium dioxide powder, followed by mixing, thus manufacturing a mixed powder;
   (d) compression-molding the mixed powder to manufacture a green pellet; and
   (e) heating the green pellet in a sintering furnace in a reducing atmosphere to sinter the green pellet.

6. The method of claim 5, wherein the additive is 0.05 to 0.15 parts by weight based on 100 parts by weight of uranium dioxide.

7. The method of claim 6, wherein lanthanum oxide is 0.005 to 0.015 parts by weight, aluminum oxide is 0.015 to 0.045 parts by weight, and silicon oxide is 0.03 to 0.09 parts by weight based on 100 parts by weight of the uranium dioxide.

8. The method of claim 5, wherein step (e) is performed at 1730 to 1780° C.

9. The method of claim 5, wherein in step (e), an injection rate of a hydrogen gas is maintained at 200 to 2,000 ml/min.

* * * * *